(No Model.)
P. HAAG.
BICYCLE BRAKE.
No. 486,464. Patented Nov. 22, 1892.
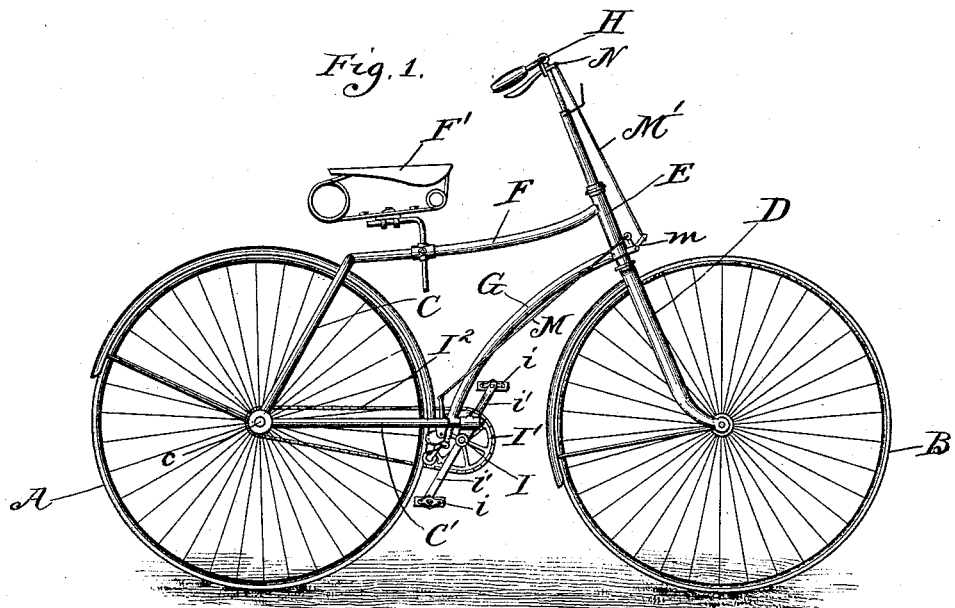
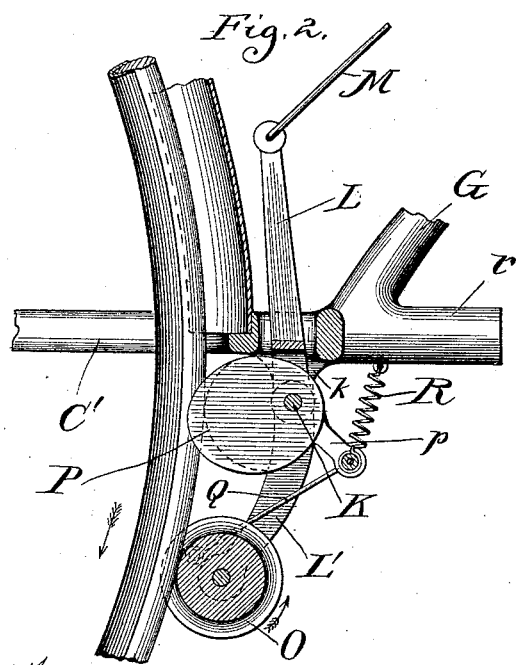
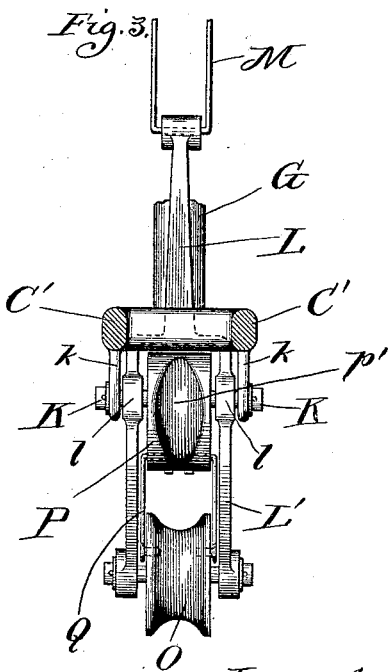
Witnesses
W. C. Colles
A. M. Best.
Inventor
Paul Haag
By _____
Atty's.

UNITED STATES PATENT OFFICE.

PAUL HAAG, OF CHICAGO, ILLINOIS, ASSIGNOR TO ALFRED FEATHERSTONE, OF SAME PLACE.

BICYCLE-BRAKE.

SPECIFICATION forming part of Letters Patent No. 486,464, dated November 22, 1892.

Application filed November 10, 1890. Serial No. 370,841. (No model.)

*To all whom it may concern:*

Be it known that I, PAUL HAAG, a citizen of the United States, residing at Chicago, in the county of Cook and State of Illinois, have invented a certain new and useful Improvement in Bicycle-Brakes, which is fully set forth in the following specification, reference being had to the accompanying drawings, in which—

Figure 1 is a side elevation of a bicycle having my improved brake mechanism applied thereto. Fig. 2 is a side elevation of that portion of the bicycle-frame which is adjacent to the driving-gear and showing the attached parts of the driving mechanism, the said figure being on an enlarged scale. Fig. 3 is an irregular transverse vertical section on the line 3 3 of Fig. 2.

My invention relates to bicycles, tricycles, and similar vehicles; and the object of my invention is to provide a brake mechanism which can be readily brought into operation and which shall utilize both the power of application and the momentum of the moving machine to insure the certain and effective application of the brake.

To the above ends my invention consists in certain peculiar and novel features of construction and arrangement, as hereinafter described and claimed.

Referring to the accompanying drawings, A designates the rear or carrying wheel, and B the front or steering wheel, of a bicycle. As illustrated, this bicycle is of what is known as the "safety" type. The rear wheel A has its axle-bearing at the juncture of the upper back fork C and the lower back fork C', as indicated at c, while the front or steering wheel has its axle-bearing in the lower end of the front or steering fork D. The upper end of the upper back fork C is connected to the steering-head E by the usual seat-bar F, upon which a suitable seat or saddle F' is mounted, and the front end of the lower back fork C' is connected to the steering-head E by the usual backbone G. Above the steering-head E is the usual handle-bar H, while at the point of juncture of the backbone G with the lower back fork C' is journaled the usual crank-shaft I, carrying suitable treadles $i$ at the extremities of its crank-arms $i'$. This crank-shaft carries, also, the usual sprocket-wheel I', over which runs a drive-chain $I^2$, which runs, also, over a sprocket-wheel upon the axle of the rear wheel A. As will be seen from the ensuing description, this particular type of bicycle is shown as illustrating most clearly the structure and operative action of my improved brake mechanism; but it is to be observed that I contemplate the application of my invention to other than this precise type of safety-machine, and also to other forms of bicycles, tricycles, and similar vehicles.

The front end of the lower back fork C' carries two pendent lugs $k$, in the lower ends of which is loosely inserted a cross-pin K. Upon this cross-pin K are loosely mounted, as at $l$, the forked arms L' of the brake-lever L. The upper end of this lever L is connected by a double link M, embracing the steering-fork E, with one arm of a bell-crank $m$, which is pivoted on the steering-head E, while a link M' connects the opposite arm of the bell-crank with the usual brake-bar N.

Between the lower extremities of the brake-lever fork L' is journaled a friction-wheel O, the periphery of which is preferably grooved to receive the tire of the rear wheel A, while upon the cross-pin K is mounted an elliptical cam-wheel P, the cross-pin K extending transversely through the cam-wheel near one end of the same. Adjacent to the point of passage of the pin K through the cam-wheel P, said wheel carries an arm $p$, to the outer extremity of which is attached a link Q, preferably of inverted-U shape. The extremities of this link Q are connected eccentrically to opposite sides of the friction-wheel O. The outer extremity of the arm $p$ of the cam-wheel P is connected to the adjacent part $r$ of the machine-frame by a spiral retracting-spring R, and the periphery of the cam-wheel P is preferably provided with a groove or recess $p'$ to receive the tire of the rear wheel A.

From the above description it will be seen when the machine is being propelled the rear wheel A will revolve in the direction indicated by the arrow 1 in Fig. 2. If now the brake be applied, as usual, through the medium of the brake-lever N, the friction-wheel O will be moved into contact with the tire of the wheel A and will be partially revolved thereby in the direction of the arrow 2 in Fig. 2. This partial revolution of the wheel O, acting through the link Q and arm p, raises the cam P and brings its periphery into forcible contact with the tire of wheel A. Thus both the power applied by the operator upon the brake-bar N and the power arising from the momentum of the vehicle are utilized by the brake mechanism and forcibly and quickly arresting the progress of the machine. As soon as the operator releases the brake-bar N the spring R draws the cam P out of engagement with the tire of wheel A and the vehicle can be propelled without any resistance from the brake mechanism.

Having thus described my invention, what I claim as new, and desire to secure by Letters Patent, is—

1. In a brake mechanism for bicycles and similar vehicles, the combination of a movable cam operating by contact with a wheel of the vehicle and a revoluble friction-wheel operatively connected to the cam and serving to move the latter into operative position, substantially as set forth.

2. In a brake mechanism for bicycles and similar vehicles, the combination, with a pivoted brake-lever operatively connected to a brake-bar, of a revoluble friction-wheel carried by said lever and a movable braking-cam also carried by said lever and operatively connected to the said friction-wheel, substantially as set forth.

3. In a brake mechanism for bicycles and similar vehicles, the combination, with a pivoted brake-lever operatively connected to a brake-bar, of a revoluble friction-wheel carried by said lever, a movable braking-cam also carried by said lever and operatively connected to said friction-wheel, and a retracting-spring acting upon the brake-lever to release the brake, substantially as set forth.

PAUL HAAG.

Witnesses:
CARRIE FEIGEL,
A. M. BEST.